Aug. 6, 1957
L. R. JOHNSON
2,802,142
CONTROL CIRCUIT
Filed July 20, 1954
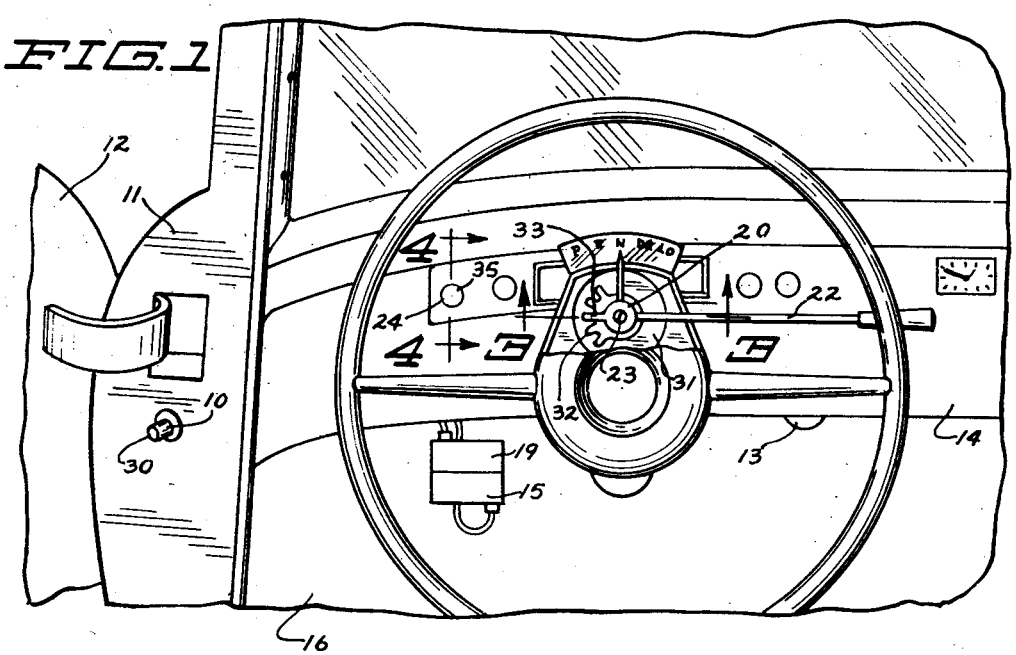
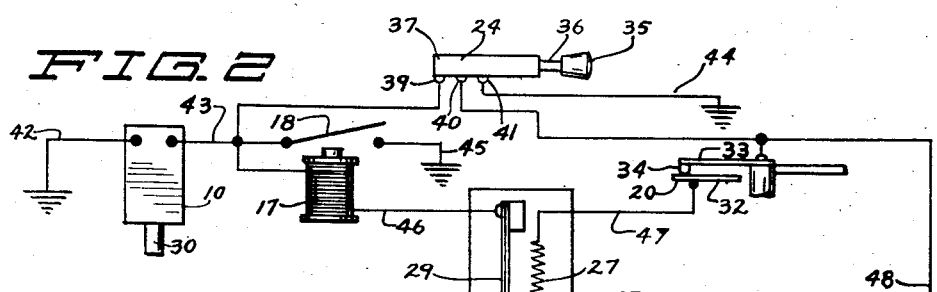
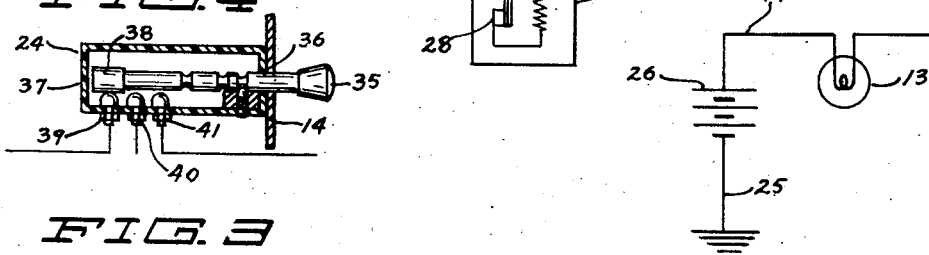
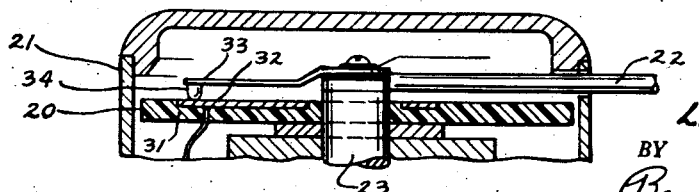
INVENTOR.
LESLIE R. JOHNSON
BY
Braddock and Braddock
ATTORNEYS United States Patent Office 2,802,142
Patented Aug. 6, 1957

2,802,142

CONTROL CIRCUIT

Leslie R. Johnson, Minneapolis, Minn.

Application July 20, 1954, Serial No. 444,418

4 Claims. (Cl. 315—80)

This invention has relation to a circuit for controlling electrical devices and more specifically to a circuit for controlling the map or dome light of an automotive vehicle so that the light will remain energized for a predetermined period of time after the switch which caused the light to be energized has been moved to open position, or until the vehicle operator is ready to move the vehicle.

This is accomplished by providing in the circuit with the light, the battery and the car door light switch; a holding coil and a holding switch operated thereby, a time delay interrupt switch and a transmission control interrupt switch. When the car door switch causes the light to be lighted in response to the opening of the car door, the holding circuit is energized so that the light will remain on after the car door switch has been opened by the closing of the car door. Energization of the light causes the time delay interrupt switch to begin its operation and when the time interval for which it is constructed has passed it will open to cause the light to be extinguished and to allow the holding circuit to relax. Should the operator desire to move the vehicle before this time delay has taken place and the light extinguished, movement of the transmission control lever by him will operate the transmission control interrupt switch and will extinguish the light and allow the holding circuit to relax.

A disabling switch is provided so that the delayed action features of the circuit will be disabled and so that the car door switch will operate as a straight on-off switch in the conventional manner. Provision is also incorporated into the disabling switch for using it as an on-off switch when the car door switch is held in its open position.

In the drawings,

Fig. 1 is a fragmentary elevational view of the interior of a car showing the positioning of various elements of a circuit of the present invention;

Fig. 2 is a schematic representation of a circuit of the present invention;

Fig. 3 is a fragmentary vertical sectional view of a gear shift interrupt switch taken on the line 3—3 in Fig. 1; and Fig. 4 is a vertical sectional view of a disabling switch taken on line 4—4 in Fig. 1.

Referring to the drawings and the numerals of reference thereon, a car door light switch 10 is mounted on a car door frame 11 which supports car door 12. The light which is controlled by the car door switch 10 and the other elements of the circuit may be mounted in any convenient position or location throughout the car, but, as shown, this electric light 13 is mounted on a lower portion of a dash panel 14 of the car. As disclosed herein, a time delay interrupt switch 15 is mounted on a fire wall 16 but it could be mounted in any other convenient location. A holding coil 17 and its associated holding switch 18 are enclosed in a suitable case 19 which is mounted adjacent the time delay interrupt switch 15. The transmission control interrupt switch 20 is mounted in a housing 21 for a transmission control lever 22 and a transmission control control rod 23. A disabling switch 24 is mounted on the dash panel 14. A ground strap 25 connects a car battery 26 to ground in the usual manner.

The time delay interrupt switch 15 includes a heating element 27 in series through switch contacts 28 with a bi-metallic strip 29.

The car door light switch 10 is of the normally closed type and is moved to the open position when the car door 12 impinges on a car door light switch control rod 30.

Holding switch 18 is normally open and is moved to the closed position when holding coil 17 is energized.

Transmission control interrupt switch 20 consists of a disc 31 of insulating material into which has been imbedded a series of electrically connected metallic fingers 32. This disc 31 and the associated fingers 32 are fixedly mounted to be concentric with the transmission control control rod 23 and to be fixed with respect to the housing 21. A metallic movable control arm 33 is insulated from and mounted on transmission control control rod 23 to be movable with movement of gear shift lever 22. A brush 34 extends downwardly from the movable control arm 33 to come into contact with the upper surfaces of the disc 31 and the conducting fingers 32. When the transmission control lever 22 is in position to cause the gears to be in any of the drive positions or in neutral, the brush 34 will be in contact with one of the conducting fingers 32 and there will be an electrical connection between the control arm 33 and said fingers 32. When the transmission control lever is moved to cause the gears to move from any of the drive positions or the neutral position to any other of said positions, the brush 34 will be brought into contact with the insulating disc 31 and electrical connection between the movable arm 33 and the conducting fingers 32 will be interrupted.

Disabling switch 24 is positioned to be manually operable by the driver of the car. It includes an operating handle 35, a control rod 36 integral therewith and slidably mounted in an insulating case 37. A ring 38 of copper or other conducting material is integral with the control rod 36 and a series of three binding posts 39, 40 and 41 extend from outside of the case 37 to position inside thereof where they can each be contacted by the ring 38 to provide, when desired, electrical connection between adjacent binding posts.

A wire 42 extends from a first side of the car door light switch 10 to ground. Wire 43 extends from a second side of said door switch 10 to a first side of the holding coil 17, to a first side of the holding switch 18 and to the binding post 39 of the disabling switch 24. A wire 44 extends from the binding post 41 of the disabling switch 24 to ground, a wire 45 extends from a second side of the holding switch 18 to ground, and wire 46 extends from a second side of the holding coil 17 to a first side of the time delay interrupt switch 15. A wire 47 connects a second side of the time delay interrupt switch 15 to the conducting fingers 32 of the gear shift interrupt switch 20. A wire 48 extends from a first side of the light 13 to the movable control arm 33 and to the binding post 40 of the disabling switch 24. A wire 49 extends from a second side of the light 13 to the battery 26.

*Operation*

In many cases it is advantageous for the interior lights of a car to remain on for a relatively short period of time after the occupants have left the vehicle. A control circuit constructed according to the present invention provides for this time delay. When the car door 12 is opened, the car door light switch control rod is released and the normally closed car door light switch moves to its closed position to establish a closed circuit from ground through said light switch, the wire 43, holding coil 17, bi-metallic strip 29, the switch contacts 28 and the heating element 27 of the time delay interrupt switch 15, through wire 47, conducting fingers 32, the brush 34, the movable control arm 33, and the wire 48 to the light 13. Since the light is connected through the wire 49 to the battery 26 and then back to ground along ground strap 25, the light will be energized. This flow of energy through the circuit and along holding coil 17 causes the holding switch 18 to be pulled into its closed position establishing a contact between a first side of the holding coil 17, along wire 43, through holding switch 18 and wire 45 to ground. When the door 12 is shut to cause the control rod 30 of the switch 10 to move said switch to open position, the light 13 will remain energized. The current flowing through the circuit and through heating element 27 of the time delay interrupt switch 15 will cause the bimetallic switch 29 thereof to become heated. When sufficient heat has been absorbed by the bi-metallic strip 29, it will be deformed to cause switch contacts 28 to be separated from each other and the circuit including the light 13 will be interrupted and the light will be extinguished. This interruption of the circuit will also interrupt the current flowing in the holding coil 17 and the holding switch 18 will relax to its normally open condition.

While a heated bi-metallic strip is disclosed herein as the operating means of the time delay interrupt switch 15, it is to be understood that a plunger type or magnetic flux decay type or any one of a number of other types time delay interrupt switches would serve just as well.

In the event that the light 13 was lighted due to the opening of the door 12 as the driver entered the car, he would in many cases not wish to wait for the lapse of time occasioned by operation of the time delay interrupt switch before extinguishing said light. For this reason, the transmission control interrupt switch is provided. After the driver has entered the car and has shut the door, the light will remain on as the time delay interrupt switch begins its operation. This allows the driver to use the light to place his keys in the ignition switch and to do all of the things which he might wish to do before putting the car in motion. When he is ready to put the car in motion, he must move the transmission control lever from neutral to one of the drive positions. In so doing, he will rotate the movable control arm 33 and the brush 34 to cause the brush to leave one of the conducting fingers 32 and to ride over the surface of the insulating disc 31 before it contacts another finger 32. During the short interval of time when the electrical connection between the fingers 32 and the movable arm 33 is broken, the circuit including the light 13 will be interrupted and the light will be extinguished. At the same time, the current flowing through the holding coil 17 will be interrupted and the holding switch 18 will relax to its normally open position so that when the brush 34 again comes into contact with one of the fingers 32, the circuit will be open at the holding switch and the light 13 will not be energized.

In the event that the driver wishes to operate the light 13 without any time delay, the disabling switch 24 is provided. As seen in Fig. 4, each of the binding posts 39, 40 and 41 are insulated from each other. To disable the time delay circuit, the operating handle 35 of the disabling switch is pulled outwardly from the dash panel 14 to cause the copper ring 38 to make contact with both of the binding posts 39 and 40. This provides a direct short circuit for the delay mechanism from the first side of the holding coil 17 to the movable control arm 33. The resistance to flow of current provided by the holding coil 17 and the heating element 27 of the time delay interrupt switch 15 is such that this short circuit through wire 43, binding post 39, copper ring 38, binding post 40, and wire 48 will prevent sufficient current from flowing through coil 17 to close holding switch 18.

It is sometimes advantageous to operate the interior lights of the car without opening any of the doors. In order to accomplish this, the operating handle 35 of the disabling switch 24 is moved farther out from the dash panel 14 to cause the copper ring 38 to come into contact with the binding post 40 and the binding post 41. A circuit is then established from ground, along wire 44, binding post 41, copper ring 38, binding post 40, through wire 48, through light 13, along wire 49, through battery 26 and along the ground strap 25 to ground. This causes light 13 to be energized without reference to the positioning of the car door switch and without reference to the operation of the time delay mechanism.

What is claimed is:

1. In an automotive vehicle having a door and a transmission control lever, a circuit for controlling an electric light including in a closed loop an on-off switch fixedly mounted on said vehicle in alinement with said door to be in closed condition when said door is open and to be in open condition when said door is closed, a holding coil, a time delay first interrupt switch, a normally closed second interrupt switch movable to open condition responsive to movement of said transmission control lever, an electric light to be controlled and a battery, and a normally open holding switch connected in parallel with said on-off switch and movable to closed condition in response to energization of said holding coil.

2. In an automotive vehicle having a door, an automobile control device and an electric light to be controlled; a system for controlling said light including activation means operable on the opening of said door to energize said light, interrupt means operable to de-energize said light in response to activation of said automobile control device, and time delay means initiated by said activation means on the opening of said door to de-energize said light after elapse of a predetermined time.

3. In an automotive vehicle having a door, an automobile control device and an electric light to be controlled; a system for controlling said light including activation means operable to energize said light when said door is in an open condition, holding means operable when in an energized state to maintain said light in an energized condition after said door has been opened and closed and to cause said light to be deenergized when said holding means becomes de-energized, interrupt means operable to de-energize said holding means in response to activation of said automotive vehicle control device, and time delay means initiated by said activation means on the opening of said door to de-energize said holding means after the lapse of a predetermined time interval.

4. The combination as specified in claim 3 and manually operable disabling means operable to disable said holding means, interrupt means and time control means to permit said light to be energized by said activation means when said door is in open condition and to be de-energized by the operation of said activation means when said door is in a closed condition.

References Cited in the file of this patent

UNITED STATES PATENTS

| | | |
|---|---|---|
| 2,076,987 | Edwards | Apr. 13, 1937 |
| 2,439,474 | Kennelly | Apr. 13, 1948 |
| 2,472,157 | Gordon | June 7, 1949 |